United States Patent
Lee

(10) Patent No.: US 12,003,470 B2
(45) Date of Patent: Jun. 4, 2024

(54) USER TERMINAL AND METHOD FOR DISPLAYING INTEGRATED COMMUNICATION HISTORY OF THE USER TERMINAL

(71) Applicant: Pantech Corporation, Seoul (KR)

(72) Inventor: Joon-Seub Lee, Incheon-si (KR)

(73) Assignee: PANTECH CORPORATION, Seoul (KR)

( * ) Notice: Subject to any disclaimer, the term of this patent is extended or adjusted under 35 U.S.C. 154(b) by 143 days.

(21) Appl. No.: 17/167,196

(22) Filed: Feb. 4, 2021

(65) Prior Publication Data

US 2021/0160205 A1     May 27, 2021

Related U.S. Application Data

(63) Continuation of application No. 14/300,525, filed on Jun. 10, 2014, now abandoned.

(30) Foreign Application Priority Data

Jul. 26, 2013    (KR) ........................ 10-2013-0089111

(51) Int. Cl.
| | |
|---|---|
| *H04L 51/216* | (2022.01) |
| *G06F 3/04817* | (2022.01) |
| *G06F 3/0482* | (2013.01) |
| *H04L 51/56* | (2022.01) |

(52) U.S. Cl.
CPC ........ *H04L 51/216* (2022.05); *G06F 3/04817* (2013.01); *G06F 3/0482* (2013.01); *H04L 51/56* (2022.05)

(58) Field of Classification Search
CPC .............................. H04L 51/216; H04L 41/00
USPC ........................... 715/752; 709/224; 455/418
See application file for complete search history.

(56) References Cited

U.S. PATENT DOCUMENTS

| | | | |
|---|---|---|---|
| 2011/0231544 A1* | 9/2011 | Javenpaa ................ | H04L 67/54 709/224 |
| 2013/0143512 A1* | 6/2013 | Hernandez .............. | H04W 4/00 455/418 |
| 2013/0339520 A1* | 12/2013 | Jang .................. | H04M 1/27453 709/224 |

FOREIGN PATENT DOCUMENTS

EP            1764949 B1 *   7/2010 ............. H04L 41/00

* cited by examiner

*Primary Examiner* — Ruay Ho
(74) *Attorney, Agent, or Firm* — Ladas & Parry, LLP

(57) ABSTRACT

A method for displaying an integrated communication history of a user terminal, the method including the user terminal transmitting or receiving a content using an integrated communication service, and executing instructions on a processor of the user terminal to perform processes of collecting communication history of content transmission or reception by a communication history manager using the integrated communication service, providing a lock setting capability within the user terminal to the communication history manager, generating a user interface feature based on the communication history that is not locked by the communication history manager, and displaying the communication history in a user interface on a display of the user terminal in association with the user interface feature.

14 Claims, 18 Drawing Sheets

FIG. 2

| Suffixes applicable | Media type and subtype(s) |
|---|---|
| .3dm | x-world/x-3dmf |
| .3dmf | x-world/x-3dmf |
| .avi | video/avi |
| .mp3 | audio/mpeg |

| | | |
|---|---|---|
| ♫ | MISS KOREA<br>HYORI LEE | ☑ |
| ♫ | MY LOVE<br>SEUNGCHUL LEE | ☑ |
| ♫ | ALL RIGHT<br>TWO-MONTH | ☑ |
| ♫ | WHY DID YOU JUST COME..<br>JUNG YUP | ☑ |
| ♫ | SHORT HAIR<br>GAK HUH | ☑ |
| ♫ | BAD BOY<br>SISTAR | ☑ |

20c

USER TERMINAL AND METHOD FOR DISPLAYING INTEGRATED COMMUNICATION HISTORY OF THE USER TERMINAL

CROSS-REFERENCE TO RELATED APPLICATIONS

This application is a continuation of U.S. patent application Ser. No. 14/300,525, filed on Jun. 10, 2014, and claims priority from and the benefit under 35 U.S.C. § 119(a) of Korean Patent Application No. 10-2013-0089111, filed on Jul. 26, 2013, the entire disclosures of which is incorporated herein by reference for all purposes.

BACKGROUND

Field

The following description relates to a user terminal, and more particularly, to a user terminal capable of supporting integrated communication and a method for displaying a communication history of the user terminal.

Discussion of the Background

With the development of information communication technologies, types of user terminals have diversified. Especially, diversification of mobile electronic devices, as portable terminals, is noticeable. For example, portable electronic devices, such as Moving Picture Experts Group (MPEG)-1 or MPEG 2 Audio Layer III (MP3) players, digital cameras, portable multimedia players (PMP), navigation systems, portable game players, electronic dictionaries, E-book readers, digital multimedia broadcasting (DMB) receivers, and the like, have gained popularity. In addition, mobile computers, such as smartphones, tablets, and smart pads, have proliferated rapidly, so that the relevant industries are growing fast.

Also, with the expanding distribution of Wi-Fi routers and the commercialization of Long Term Evolution (LTE) technology, which is one of high-speed mobile communication technologies, fast transfer of large-scale data through a mobile device is feasible. Transfer of various types of content among different mobile terminals has accordingly increased, and a great variety of communication services have been developed and available in support of the content transfer. Conventionally, communication services for the content transfer may be limited in supportable types of content and/or communication protocols according to service providers and/or service provision methods.

A next-generation integrated communication service, such as a Rich Communication Suite (RCS) service, has been standardized, led by Global System for Mobile Communication Association (GSMA), and the commercialization of such service has been offered in some countries, including Korea. The next-generation integrated communication service, which may be referred to as integrated communication or RCS, may integrate all capabilities of a user terminal through an application installed in the user terminal, which includes, for example, calls, short message service (SMS) or multimedia messaging service (MMS), chat, file transfer, data sharing. The integrated communication service also allows for interworking with an RCS client or RCS service of another vendor. Further, the integrated communication service enables the transfer of multimedia, including voice, images, and text, based on user's presence, and provides all-IP-based upgraded services in terms of messaging and circuit switched (CS)-based voice domain.

The representative features of the integrated communication services may include an Enriched Call that enables a user to share multimedia, such as video or photo, during a call, an Enhanced Messaging that provides any types of communication in a conversational form, and an Enhanced Phonebook that allows communication to be able to be initiated from a phonebook by selecting a communication type, such as, one-to-one communication, group chat, and file transfer. As described above, in some countries, the up-to-date standardized integrated communication services have been commercially available.

As the integrated communication services are becoming more available, the amount of content to be transferred through the integrated communication has increased as well as types of the content. Once a conversation has ended, the transferred content may not be needed any longer, yet, in some cases, the transferred content and related information may be required later. The proliferation of integrated communication services and the resulting increase of the amount of content transferred may lead to growing importance of management of the transferred content.

However, the presently used user terminals only allow a user to directly access a folder that stores the transferred content, run an application to execute the stored content, or check the transferred content individually by searching the previous communication that has been made through the integrated communication service. That is, the current user terminal does not offer a separate capability to manage content that is transmitted or received during the integrated communication service.

The above information disclosed in this Background section is only for enhancement of understanding of the background related to the following disclosure and therefore it may contain information that does not form any part of the prior art.

SUMMARY

Exemplary embodiments of the present invention provide a user terminal capable of supporting integrated communication and a method for displaying a communication history of the user terminal.

Additional features of the invention will be set forth in the description which follows, and in part will be apparent from the description, or may be learned by practice of the invention.

Exemplary embodiments of the present invention provide a method for displaying an integrated communication history of a user terminal, the method comprising the user terminal: transmitting or receiving a content using an integrated communication service; and executing instructions on a processor of the user terminal to perform processes of; collecting communication history of content transmission or reception by a communication history manager using the integrated communication service, the communication history including at least one of content type, content transmission time, and content sender/recipient contact of each content transmission or reception; providing a lock setting capability within the user terminal to the communication history manager, the lock setting capability configured to allow a user of the user terminal to arbitrarily lock and unlock part of the communication history based on (i) a contact of the transmission or reception, or (ii) a type of the transmission or reception; generating a user interface feature based on the communication history that is not locked by the communication history manager; and displaying the communication history in a user interface on a display of the user terminal in association with the user interface feature, wherein the user interface excludes communication history that has been locked.

Exemplary embodiments of the present invention also provide a user terminal to display an integrated communication history, the user terminal comprising: at least one application to support an integrated communication service; a communicator to transmit or receive content using the integrated communication service; a communication history manager to collect communication history of content transmission or reception using the integrated communication service, the communication history including at least one of content type, content transmission time, and content sender/recipient contact of each content transmission or reception; an interface manager to generate a user interface feature based on the communication history; the communication history manager providing a lock setting capability within the user terminal, the lock setting capability configured to allow a user of the user terminal to arbitrarily lock and unlock part of the communication history based on (i) the contact of the transmission or reception, or (ii) the type of the transmission or reception; and an image display to display a user interface comprising the user interface feature, wherein the image display displays the communication history in a user interface in association with the user interface feature, the displayed communication history including the content type, the content transmission time, and the content sender/recipient contact of each content transmission or reception that is not locked by the communication history manager, and wherein the interface manager is configured to exclude communication history that has been locked when generating a user interface.

Exemplary embodiments of the present invention also provide a method for displaying an integrated communication history of a user terminal, the method comprising: transmitting and/or receiving a content using an integrated communication service; collecting communication history of content transmission or reception using the integrated communication service; classifying the contents of the collected communication history according to a content type based on content information to generate a classified communication history; generating a user interface feature based on the classified communication history; and displaying the classified communication history in association with the user interface feature, wherein the content type comprises at least one of text communication, image data, video data, documents, URL, and location information.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 2 is a table listing file formats used in integrated communication services introduced by Global System for Mobile Communication Association (GSMA) according to an exemplary embodiment of the present invention.

FIG. 6A, FIG. 6B, FIG. 6C, FIG. 6D, FIG. 6E, and FIG. 6F are diagrams illustrating a user interface that is capable of being modified based on a communication history according to exemplary embodiments of the present invention.

FIG. 7A, FIG. 7B, and FIG. 7C are diagrams illustrating a method for displaying an integrated communication history when an application, other than an RCS call application, is executed according to exemplary embodiments of the present invention.

DETAILED DESCRIPTION OF THE ILLUSTRATED EMBODIMENTS

Figure 1:
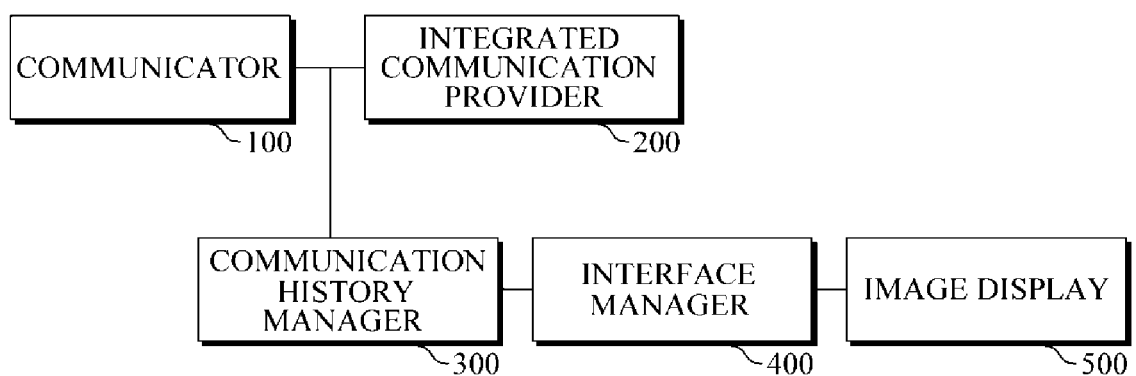
FIG. 1 is a block diagram illustrating a user terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

FIG. 1 is a block diagram illustrating a user terminal according to an exemplary embodiment of the present invention.

The user terminal of FIG. 1 may be a mobile device capable of communicating with other user terminals or a service server through one or more wireless communication networks. For example, the user terminal may include, without limitation, a mobile phone, a Moving Picture Experts Group (MPEG)-1 or MPEG 2 Audio Layer III (MP3) player, a digital camera, a portable multimedia player, a navigation system, an electronic dictionary, an e-book reader, a digital multimedia broadcasting (DMB) receiver, a smartphone, a tablet computer, or the like. The user terminal may also include a fixed device, such as a personal computer (PC), capable of communicating with another user terminal or a service server through a wired/wireless communication network.

In addition, the user terminal of FIG. 1 may be capable of performing an integrated communication. More specifically, the user terminal may be equipped devices or hardware/software components to support a Rich Communication Suite (RCS) capability. According to aspects of the invention, integrated communication may include, or have similar or same meaning as, RCS. The user terminal may be a device capable of communicating with another user terminal or a service server according to integrated communication services, which may be in compliance with the current RCS standards and/or the future integrated communication services, which may be in compliance with RCS standard updates. Such integrated communication capabilities may be implemented by a predetermined application equipped in the terminal or be provided to the user terminal by additionally installing an application with the integrated communication capabilities to the terminal.

Content described herein may refer to one or more types of data capable of being transmitted through the integrated communication service, and there is no limit in the form of data. For example, content may include chat data, such as, text communications, voice call, image data, such as photos, data related to terminal presence, such as location information, video data, such as video and video call, general file data, such as documents, uniform resource location (URL) information, and the like.

Referring to FIG. 1, the user terminal includes a communicator 100, an integrated communication provider 200, a communication history manager 300, an interface manager 400, and an image display 500. FIG. 1 schematically illustrates some, but not all, of the elements that may be included in the user terminal and may not limited thereto. Therefore, the user terminal may further include additional elements to perform other operations in the user terminal. The additional elements may vary based on the type, capabilities, or performance of the user terminal. For example, the user terminal may further include a sensor, such as a gravity sensor, a proximity sensor, and an acceleration sensor, an oscillator, a global positioning system (GPS), a broadcast receiver, and the like.

The communicator 100 may enable the user terminal to transmit and/or receive data to and/or from another user terminal or a service server through an external network.

According to aspects of the invention, the communicator 100 may be capable of transmitting and/or receiving various types of content in an integrated communication environment provided by the integrated communication provider 200, which will be described later. The communicator 100 may communicate according to one or more communication protocols, and the number and type of the protocols are not limited. The communication protocol may include, without limitation, a mobile communication protocol, such as Global System for Mobile Communication (GSM), Code Division Multiple Access (CDMA), Wideband Code Division Multiple Access (WCDMA), Time Division Multiple Access (TDMA), Long Term Evolution (LTE), and Long Term Evolution Advanced (LTE-A), and a short-range communication protocol, such as wireless local access network (WLAN), Bluetooth®, and ZigBee®. However, aspects of the invention are not limited thereto, such that the communicator 100 may communicate according to a different type of communication protocol.

The integrated communication provider 200 may provide the user terminal with an integrated communication environment or support an integrated communication service. The integrated communication environment provided by the integrated communication provider 200 may allow the transmission of various types of content, such as audio, image, and text.

For example, the integrated communication provider 200 may allow the transmission and/or reception of content through integrated communication services in accordance with current or future RCS standards. More specifically, the integrated communication provider 200 may allow the transmission and/or reception of multimedia data or content, such as audio content, video content, and text content, based on user's presence. In addition, the integrated communication provider 200 may permit all-internet protocol (IP)-based communication of messaging and circuit switched (CS)-based voice domain.

In addition, the integrated communication provider 200 may enable the user to perform one or more activities, for example, watching a video, sharing a photo, and chat, while on a voice call. The integrated communication provider 200 may also enable various contents, such as a photo, location information, video, music, document files, URL information, along with a simple text message, to be simultaneously transmitted. Further, the integrated communication provider 200 may support transmission and/or reception of various other contents, which may be developed in future, and provide an environment to allow complex services to be provided based on such content.

The integrated communication provider 200 may provide an independent integrated communication environment while directly managing various contents used in communications. Further, the integrated communication provider 200 may provide an integrated communication environment while managing content in association with a content management device, which may manage content in an existing system equipped in the user terminal. For example, the integrated communication provider 200 may directly manage the content received from Android content provider (not shown), or indirectly manage the content by controlling a content in association with a content management device, thereby providing the integrated communication environment.

The communication history manager 300 may manage a communication history in the integrated communication environment. The communication history may refer to a group of information related to communications made in the integrated communication environment. More specifically, the communication history may refer to a group of information related to content or group of content information, which may be transmitted to and/or received from another user terminal through an integrated communication system for a predetermined period of time.

The predetermined period of time may refer to a period of time for which the integrated communication service may be used, or a particular range of time that may be set by the user or the system. The content information may include, without limitation, information related to content, for example, content type, content identifier, content name, content size, and the like. In addition, the content information may further include information related to the content transmission and/or reception, for example, content transmission time and/or a content sender or recipient.

The communication history may be in various data forms. For example, the communication history may be in a form of a linked list, in which content information may be linked to corresponding content according to the temporal order of the occurrence of communication. However, aspects of the invention are not limited thereto, such that the communication history may be a group of content information that is displayed for one or more contents.

To manage a communication history, the communication history manager 300 may collect content information about the content that is transmitted or received in the integrated communication environment. The communication history manager 300 may use various methods to collect the content information. For example, the communication history manager 300 may collect the content information, for example, at least one of a content type, a content identifier, a content name, a content size and the like. The communication history manager 300 may collect content information by using information included in header of data, transmitted or received in the integrated communication environment. In addition to or separately from the aforementioned information, the communication history manager 300 may collect various types of content information (e.g., content type, content identifier, content size, content transmission time, and content sender/recipient) related to content that is transmitted or received in communication with the integrated communication provider 200.

In addition, the communication history manager 300 may collect content information, for example, content type information of content transmitted or received according to Global System for Mobile Communication Association (GSMA) standards.

FIG. 2 is a table listing file formats used in integrated communication services introduced by GSMA according to an exemplary embodiment of the present invention.

For example, referring to FIG. 2, the communication history manager 300 may analyze the type of content based on suffixes of content, e.g., file extensions of the content used in the integrated communication services. For example, the communication history manager 300 may determine and collect content type information, such as suffixes associated with the content. For example, content type information may include a suffix of "avi" for video content and "mp3" for music content. However, aspects are not limited thereto such that other formats may be used, for example, "mov" for video content.

Referring back to FIG. 1, the communication history manager 300 may manage the communication history based on the collected content information. The communication history manager 300 may use various methods for managing communication history. For example, the communication history manager 300 may manage the communication history according to content type, as one kind of content information. Further, the communication history manager 300 may manage the communication history based on at least one of a content name, content size, content sender and/or recipient, and content transmission and/or reception time.

The communication history manager 300 may generate a communication history using at least one type of content information, and may update the existing communication history for the history management. More specifically, the communication history manager 300 may generate the communication history from the content information. The communication history may include information about at least one of a content name, a content size, a content transmission time, and a content type. In addition, the communication history manager 300 may update the communication history by adding information about new communication to the existing communication history. Further, if appropriate, the communication history manager 300 may delete or edit some or all content information in the communication history.

The communication history manager 300 may use various methods to manage the communication history. For example, the communication history manager 300 may generate a plurality of communication histories. The communication history may be generated and managed according to content types. For example, the communication history manager 300 may classify a content according to a type, such as chat/messaging, music, photo, video, word document, a general file, location information, URL, and the like. The communication history manager 300 may independently manage the communication history for each content type or groups of content types. In addition, the communication history may be generated and managed separately according to a communication partner, and content sender and/or recipient. The communication history may be stored in various data forms.

The interface manager 400 may control a predetermined user interface or user interface features to be displayed on a screen based on the communication history managed by the communication history manager 300. The user interface or its features may be displayed by classifying the communication history according to one or more predefined criteria. The user interface may be displayed according to, for example, content types, but the aspects of the invention are not limited thereto. For example, the user interface may be displayed based on at least one of a content name, a content size, content sender and/or recipient, and content transmission/reception time.

Further, upon running of an application, the interface manager 400 may control the user interface associated with the communication history to be displayed along with the display of the application. According to aspects of the invention, the user interface may refer to a user interface or user interface feature that is associated with a communication history. Further, the user interface may refer to a display screen associated with an executed application (e.g., RCS call application), which may include another user interface related to the communication history. In addition, the form of the displayed user interface may be the same regardless of the application type, or may vary with the application type. For example, a user interface associated with a call history application, which may be displayed along with a display of the existing call history, may have different form or functionality from that of a user interface associated with a contact application, which may display contacts stored in the user terminal additionally on the existing contact screen.

Upon running of a particular application in the user terminal, the interface manager 400 may load a communication history to be displayed by the running application, generate a user interface or user interface feature based on the loaded communication history, and display the user interface or user interface features along with the original display screen. The location and design of the user interface or user interface feature to be added to the original display screen (e.g., a screen designated to be displayed by the running application) may be set by a user. However, aspects of the invention are not limited thereto, such that the location and the design of the user interface or user interface features may be set automatically.

The interface manager 400 may display the whole communication history as a user interface. The interface manager 400 may also generate only a part of communication history as a user interface and display the generated user interface on the display. If the interface manager 400 generates and displays a part of the communication history as a user interface, the interface manager 400 may generate a user interface set by an application based on the communication history that has not been locked among the whole communication history managed by the communication history manager 300. The communication history managed by the communication history manager 300 may include lock setting information. For example, the communication history may be locked according to the contact or type of communication, and the interface manager 400 may exclude the locked communication history when generating a user interface.

In addition, the user terminal may include a lock setting capability to allow a user to arbitrarily lock or unlock the whole or part of the communication history. According to aspects of the invention, methods or procedures for implementing the lock setting capability are not limited. When the user unlocks the locked communication history, the interface manager 400 may display the unlocked communication history on the display through the user interface.

A user interface may be configured or set by an application to be displayed upon execution of the application. Further, the user interface may display icons corresponding to or in association with a communication history. Icons representing communication history may be predefined to be associated with certain content types. More specifically, when the user interface set by the application is set to display communication history classified based on a content type (e.g., photo), the interface manager 400 may display a particular icon that represents intention of the communication (e.g., sharing of pictures) included in the communication history. Further, the interface manager 400 may replace and display an icon for a content type that has already been communicated, transmitted, or received.

The interface manager 400 may receive a control signal through the user interface set by the application. The user interface may include an input section or region to receive the control signal from the user. In addition, the user interface may include one or more icons or menus, such as a drop-down menu, to receive various control signals. For example, the user interface may include one or more icons to receive control signals for instructing at least one of an execution, transmission, sharing of content, or providing a drop-down menu to receive control signals for selecting particular content type.

In addition, the interface manager 400 may change a display screen in response to the received control signal. More specifically, the interface manager 400 may re-generate a user interface set by an application in response to the control signal, and display the re-generated user interface. Further, the display screen displayed in response to the control signal may vary with a type of the control signal. For example, in response to a control signal for selecting a content type, the interface manager 400 may display a communication history related to the selected content type using a predefined user interface. In addition, in response to a control signal for selecting one or more contacts from a contact list, the interface manager 400 may display a communication history corresponding to the selected contact using a different user interface.

In response to a control signal, the interface manager 400 may run an application, generate a new user interface set by the application, and display the generated user interface. For example, in response to a control signal for running an application to play an MP3 file, the interface manager 400 may execute the application to play the MP3 file and display the set user interface for the application. Further, in response to a control signal for transmitting a particular content, the interface manager 400 may execute an application and/or a function of the user terminal for transmitting the content, and display a relevant user interface on the display.

The image display 500 may display a user interface under the control of the interface manager 400, and transfer the control signal generated from the user's input to the interface manager 400. For example, the image display 500 may be a touch screen.

Figure 3:
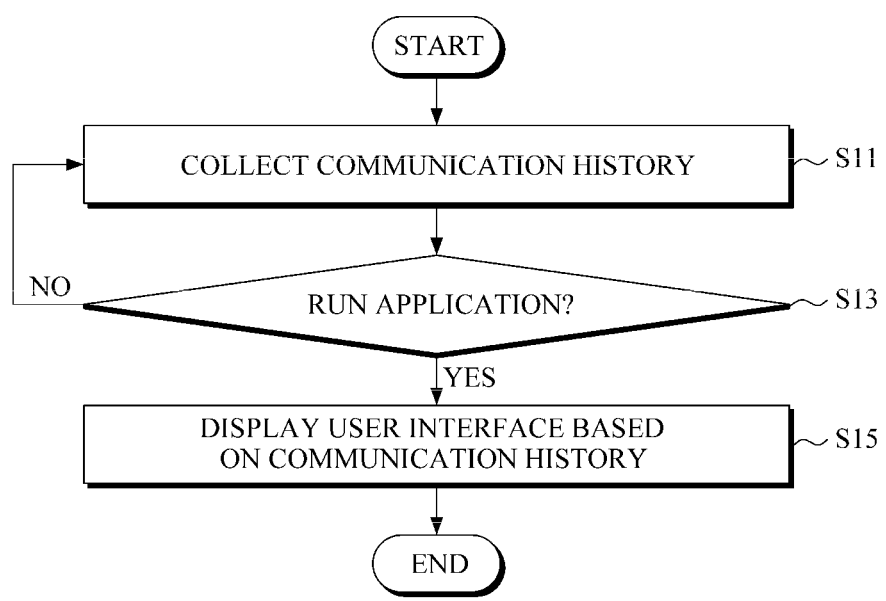
FIG. 3 is a flowchart illustrating a method for displaying a communication history of a user terminal supporting integrated communication service according to an exemplary embodiment of the present invention.

FIG. 3 is a flowchart illustrating a method for displaying a communication history of a user terminal supporting integrated communication service according to an exemplary embodiment of the present invention.

The method for FIG. 3 may be executed in the user terminal described with reference to FIG. 1. Description of the method for displaying a communication history may be limited to avoid redundancy in description. The descriptions omitted hereinafter, regarding the display of a communication history, may be similar or the same as those described above with reference to FIG. 1.

Referring to FIG. 3, the user terminal may collect and manage a communication history of content transmitted or received using an integrated communication service in operation S11. The communication history may be temporal information about content transmitted or received in an integrated communication environment. More specifically, the user terminal may collect content information of content transmitted or received in the integrated communication environment, classify types of content based on the collected content information, and manage the communication history according to the classification type. The integrated communication environment may refer to communications using various types of contents as well as general communication medium, such as voice, images, and text.

In operation S13, the user terminal monitors whether a particular application is running or not. The application may be an application dedicated for an RCS call and/or an associated application (e.g., one menu of an RCS call application). Further, the application may be, without limitation, an application for an independent phonebook, an RCS call history, or file management. For example, there is no limit in applications to be monitored as long as its associated display screen is adequate to display a communication history in accordance with a predefined standard. The communication history may be managed by the communication history manager 300 (see FIG. 1). In response to a determination made in operation S13 that the particular application is not running, the flow chart proceeds to operation S11 to continue to collect and manage the communication history.

In response to a determination made in operation S13 that the particular application is running, the flow chart proceeds to operation S15 in which the user terminal generates a user interface set by the running application. The user interface may be generated based on the communication history, which may be displayed on a display screen. The user interface may be generated by adding a user interface or user interface feature related to a communication history to an existing user interface associated with the running application. In addition, as described above, form or function of the user interface to be added may vary based on the application type. Further, even the same application may have a different or additional user interface displayed in relation to a different communication history, which may be based on the operational status of the application.

One or more operations of the method for displaying a communication history shown in FIG. 3 will be described in more detail below.

Figure 4:
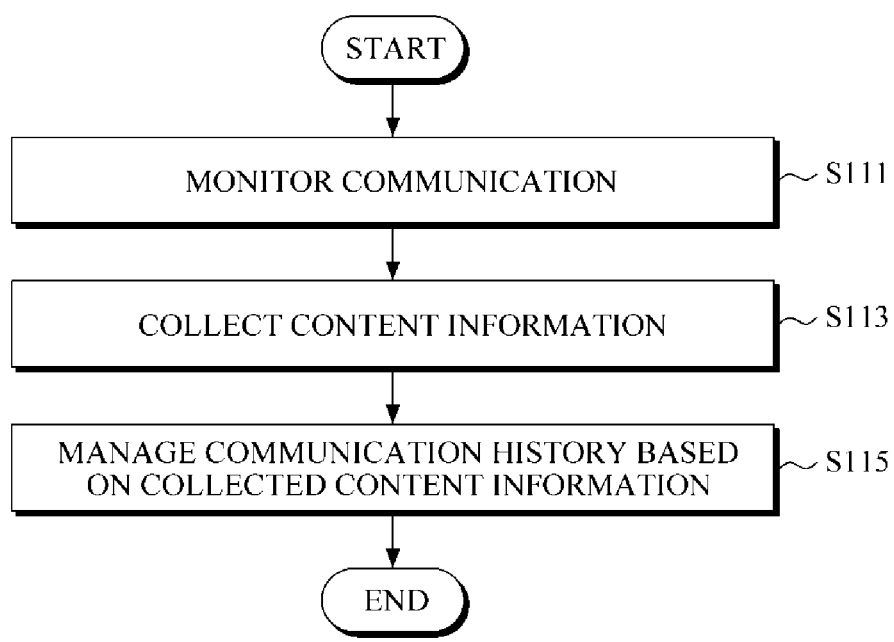
FIG. 4 is a flowchart illustrating details of operation S11 of FIG. 3 according to an exemplary embodiment of the present invention.

FIG. 4 is a flowchart illustrating details of operation S11 of FIG. 3 according to an exemplary embodiment of the present invention.

Referring to FIG. 4, a user terminal monitors communications performed in an integrated communication environment in operation S111. The integrated communication environment may allow communications using various types of content in addition to general content, such as voice, image, and text. For example, the integrated communication environment may be provided by the integrated communication provider 200 of FIG. 1.

According to aspects of the invention, the user terminal may monitor communications performed in the integrated communication environment in various ways. For example, the user terminal may monitor its communications activities by monitoring an operation of a configuration device used for providing a communication environment, or monitoring data input/output of the user terminal.

When communication activity is detected, the user terminal collects content information in operation S113. The user terminal may use various methods to collect the content information. For example, the user terminal may use various information about transmitted or received content (e.g., a file name, additional information of a file, a file extension, a communication time, sender/recipient information, etc.) to collect content information. Further, separately or together with the information about the transmitted or received content, the user information may collect content information by analyzing header of data or content transmitted or received in the integrated communication environment or by using a simple method while utilizing GSMA standards.

The user terminal manages a communication history based on the collected content information in operation S115. More specifically, the user terminal may generate a new communication history using at least one piece of content information among the collected content information. In addition, the user terminal may update the communication history by adding information about a new communication to the existing communication history. Further, when appropriate, the user terminal may delete or edit information about some communications included in the communication history or delete the entire communication history. The user terminal may manage the communication history in various methods. For example, the user terminal may manage the communication history separately according to the type of content transmitted or received, or according to the contacts. However, aspects of the invention are not limited thereto, such that the user terminal may manage the communication history according to other information or a combination of information.

Figure 5:
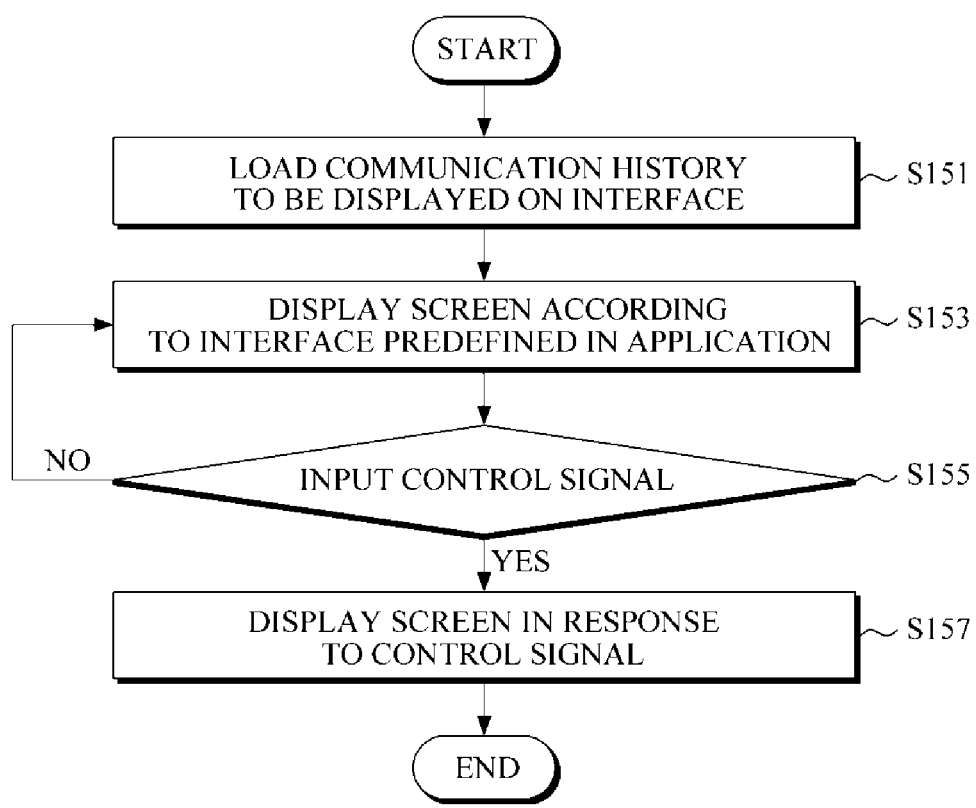
FIG. 5 is a flowchart illustrating details of operation S15 of FIG. 3 according to an exemplary embodiment of the present invention.

FIG. 5 is a flowchart illustrating details of operation S15 of FIG. 3. In addition, FIG. 6A, FIG. 6B, FIG. 6C, FIG. 6D, FIG. 6E, and FIG. 6F are diagrams illustrating a user interface that is capable of being modified based on a communication history according to exemplary embodiments of the present invention.

Referring to FIG. 5, the user terminal may load a communication history to be displayed on an interface in operation S151. Further, the user terminal may select a communication history to be loaded, if appropriate. For example, the user may load a communication history related to some types of content, or content related to a particular sharer or information included in an address book.

Moreover, the user terminal displays the user interface that may be predefined or preset by a running application together with the user interface feature related to the communication history on the screen in operation S153. More specifically, the user terminal may control the user interface, which is associated with the communication history loaded in operation S151, to be added to an original display screen of the running application. Further, the user interface associated with the communication history may vary based on the kind of application. However, aspects of the invention are not limited thereto, such that the user interface associated with the communication history may vary even with the same application. Further, the user interface may vary based on the operational status of the application.

A user interface associated with an application history may be displayed in various forms. For example, the user interface associated with the application history may be displayed as icons on the display. However, aspects of the invention are not limited thereto, such that the user interface associated with the application history may be displayed in different forms. Further, the user terminal may display the communication history by replacing a particular icon for only a history of content that has been communicated.

Figure 6A:
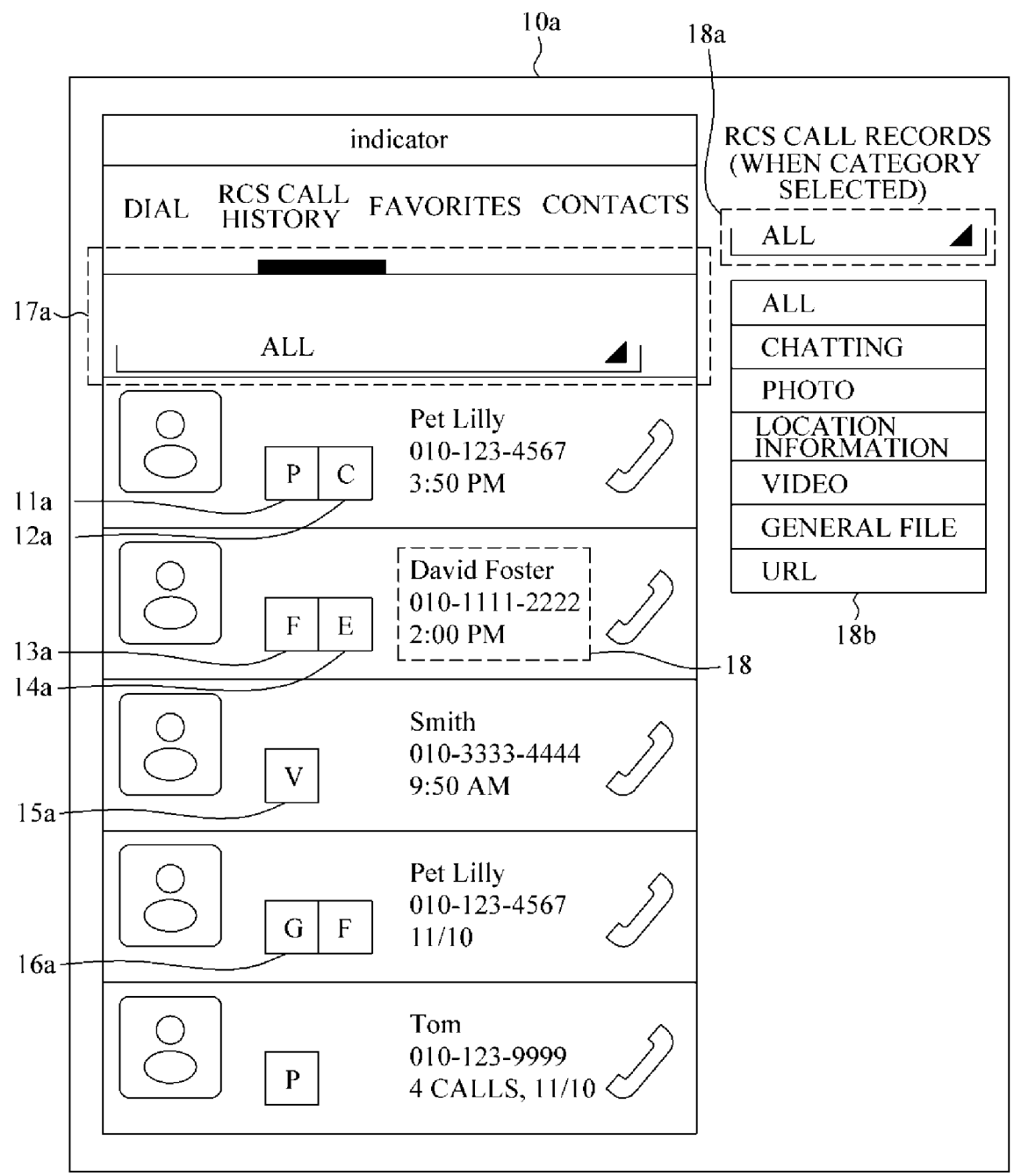

FIG. 6A is a diagram illustrating a screen displayed on the user terminal in response to an RCS call history selected in an RCS call application according to an exemplary embodiment of the present invention.

Referring to FIG. 6A, the user interface associated with a communication history may indicate RCS calls, each being represented as a particular shape of icon, including a P icon 11a, a C icon 12a, a F icon 13a, a E icon 14a, a V icon 15a, and a G icon 16a on an RCS call history screen 10a. Referring to FIG. 6A, photo content may be indicated by P icon 11a, content corresponding to a chat message is represented by icon C 12a, content as a general file is represented by icon F 13a, content as URL information is represented by icon E 14a, video content is represented by icon V 15a, and location information content is represented by icon G 16a. However, the aspects of the invention are not limited thereto, such that the icons may have different forms, including forms allowing the user to intuitively recognize the content type.

Further, the user terminal may not display icons for content that has not been communicated in the RCS call. For example, in FIG. 6A, for the RCS call with Pet Lilly at 3:50 p.m., icon P 11a and icon C 12a are displayed to indicate that the RCS call was made in which the photo content and a content corresponding to a chat message was transferred or received. However, aspects of the invention are not limited thereto, such that, unlike the above example, icons for all types of content available to be transmitted or received through RCS call may be displayed but appearing differently for transmitted/received content type and for non-transmitted/received content type. For example, the icons for the transmitted/received content type and the non-transmitted/received content type may be differentiated by differentiating a displaying method (e.g., using a solid-lined box and a dotted-lined box, or varying the opacity of the icons).

Referring back to FIG. 5, in operation S153, the user terminal generates a user interface associated with an application running based on an unlocked communication history, and displays the generated user interface. More specifically, the communication history may include lock setting information according to the contact or communication type, and the user terminal may exclude the locked communication history when generating a user interface.

Figure 6B:
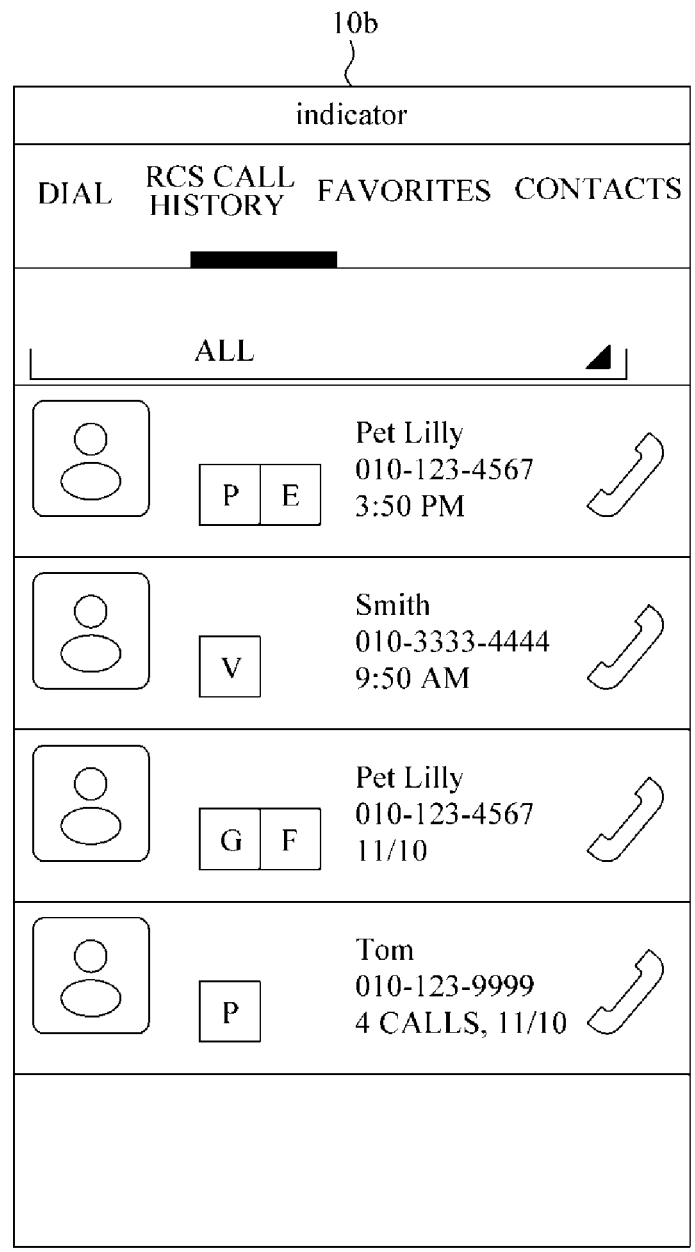
Figure 6C:
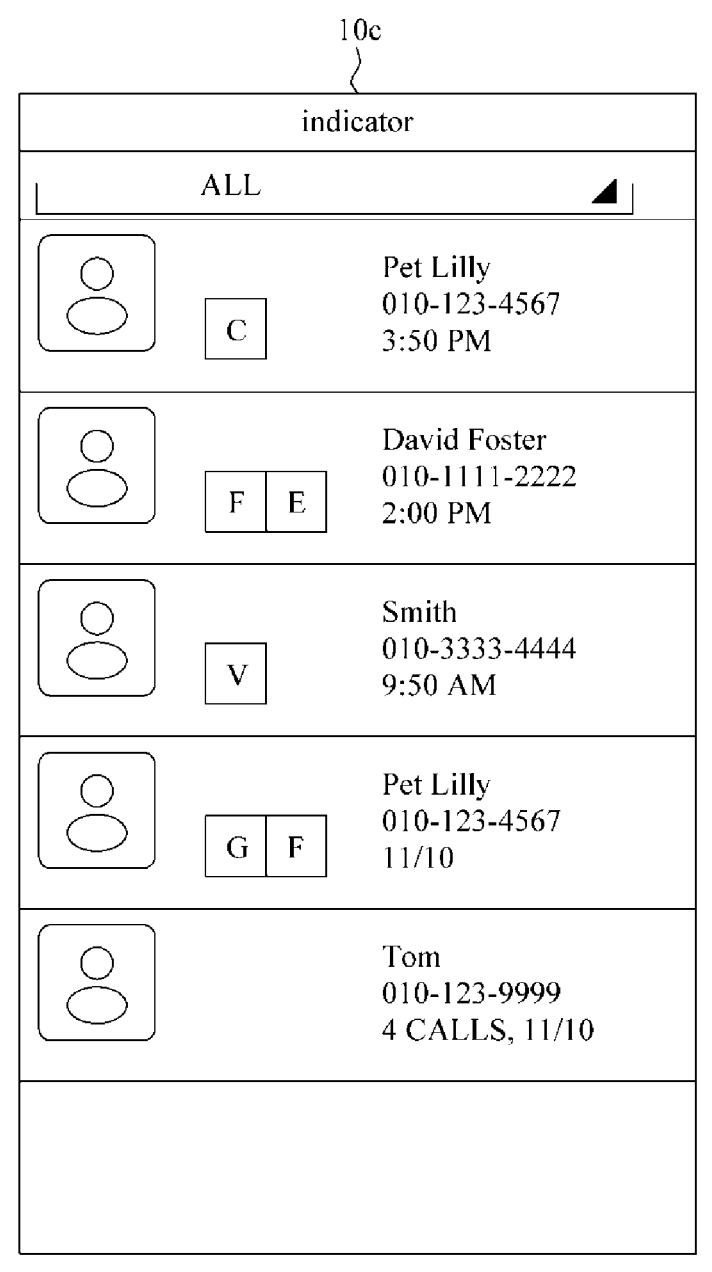

FIG. 6B and FIG. 6C are diagrams illustrating a screen displayed when some communication histories are locked in the user interface shown in FIG. 6A according to exemplary embodiments of the present invention.

FIG. 6B illustrates a screen that may be displayed when all communication history with David Foster becomes locked. FIG. 6C illustrates a screen that may be displayed when a particular content type, such as photos, becomes locked. Referring to FIG. 6B, a screen 10*b* is displayed, on which a call record with David Foster is erased from a call history of the user terminal displaying all RCS call records shown in FIG. 6A. However, aspects of the invention are not limited thereto, such that the display may display the call record with David Foster but hide icons corresponding to the content types that were transmitted/received to/from David Foster, such as F icon 13*a* and E icon 14*a* of FIG. 6A. Referring to FIG. 6C, a screen 10*b* is displayed, on which a P icon 11*a* of FIG. 6A indicating photo content is removed from the display of icons that indicate various content types that were transmitted/received to/from David Foster in the RCS call records shown in FIG. 6A.

Referring back to FIG. 5, the user terminal monitors or determines whether a control signal is inputted in operation S155. More specifically, the user terminal may detect a control signal generated through the user interface displayed on the screen. The user interface set by the application may include a region where to receive a control signal from a user. In the example shown in FIG. 6A, the RCS call history screen 10*a* of the user terminal may show icons 11*a* through 16*a* and dropdown menus 17*a* and 18*a* in a region of the RCS call history screen 10*a*, and the RCS call history screen 10*a* may further include a separate input region 18 for receiving a control signal.

Referring back to FIG. 5, when a control signal is detected, the user terminal may change a display screen in response to the control signal in operation S157. Specifically, in response to the control signal being inputted, the user terminal may generate a new user interface or modify the displayed user interface based on a communication history. Further, the screen displayed in response to the control signal may vary according to a type of control signal. Further, the user terminal may generate a user interface based on select communication histories and display the generated user interface.

Figure 6D:
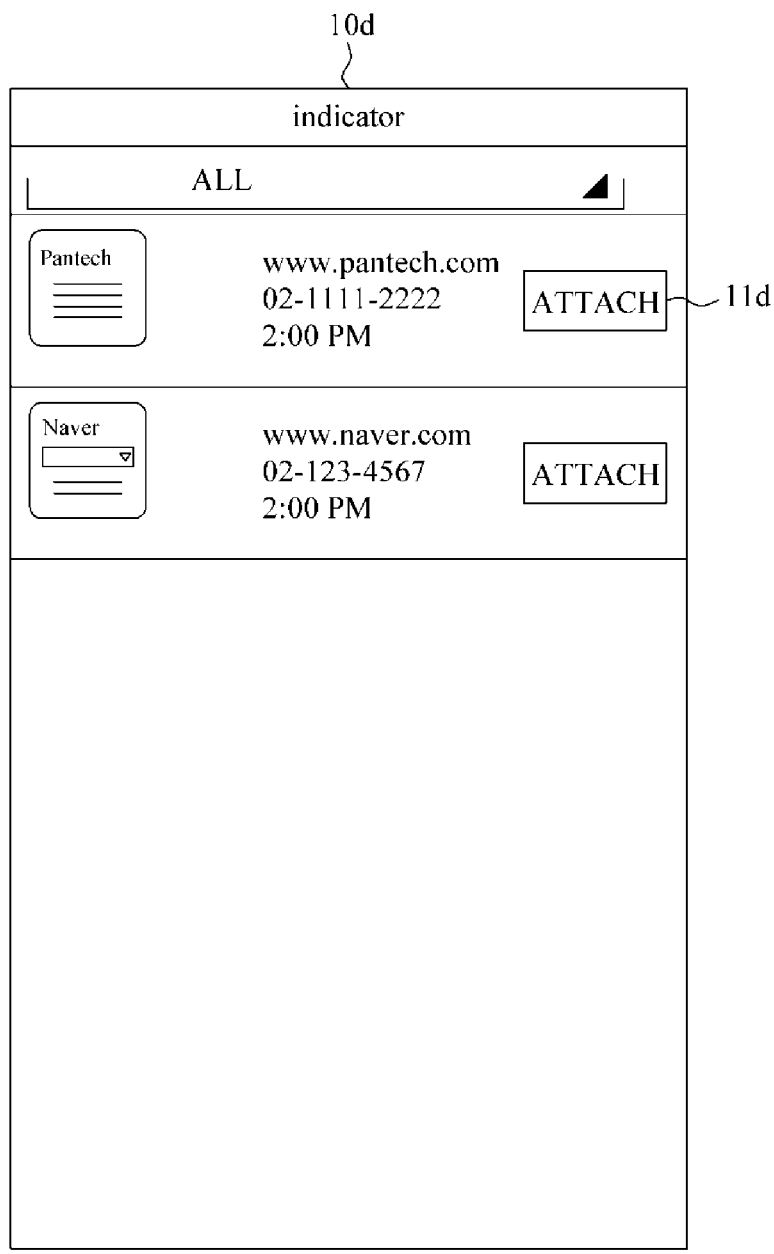

FIG. 6D is a diagram illustrating a user interface that may be displayed on a display screen when a control signal indicating a selection of icon E 14*a* that represents URL content from a call history with David Foster is detected. Referring to FIG. 6D, in response to a detection of a selection of icon E 14*a*, the user terminal extracts communication history with David Foster in relation the URL content, and displays a screen 10*d* of a new user interface generated using the extracted communication history with respect to the URL content. More specifically, FIG. 6D illustrates that URLs "www.pantech.com" and "www.naver.com" were transmitted/received to/from David Foster.

Figure 6E:
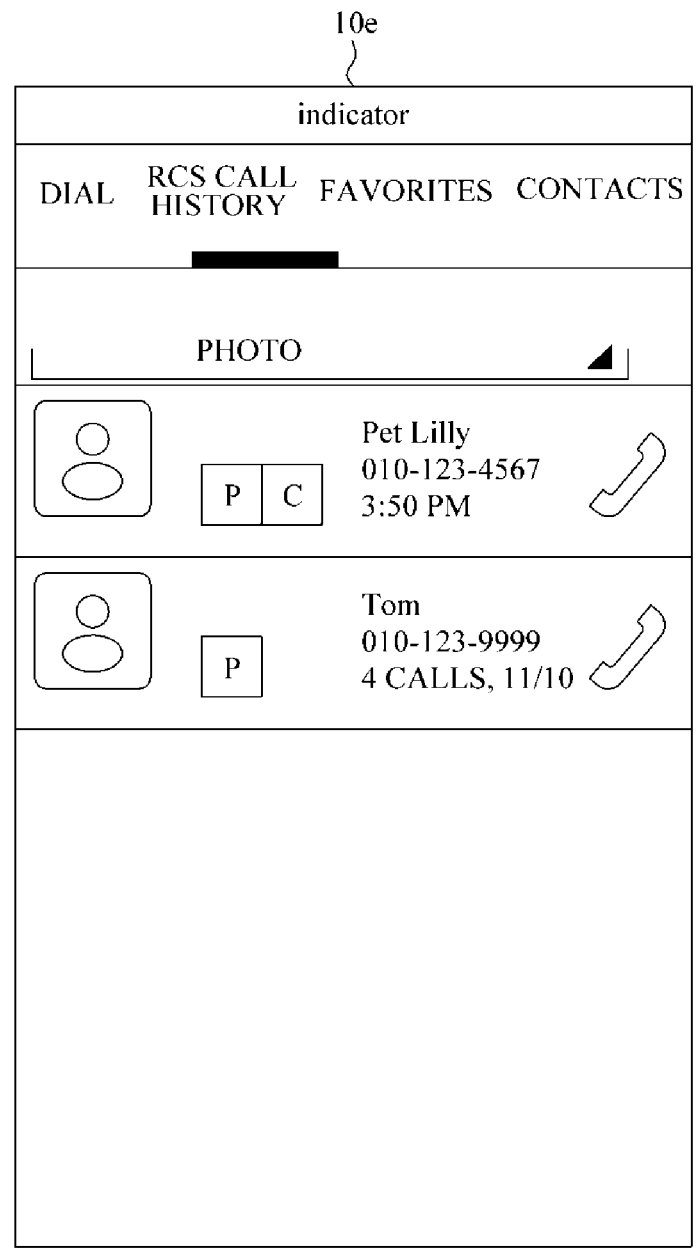

FIG. 6E is a diagram illustrating a user interface displayed when a dropdown menu 18*a* shown in FIG. 6A is selected or when one of the items included in list 18*b* appearing in the dropdown menu 18*a* being is selected. Referring back to FIG. 6A, in response to a detection that the dropdown menu 18*a* is touched or selected, the user terminal displays the list 18*b* on an upper layer of the screen to allow the user to select one or more items included in the list 18*b*. Referring to FIG. 6E, in response to a control signal being inputted to select the "photo" item included in the list 18*b*, the user terminal may extract communication histories related to photo content from among various types of content, and display the extracted communication histories on a screen 10*e* of the user terminal.

Figure 6F:
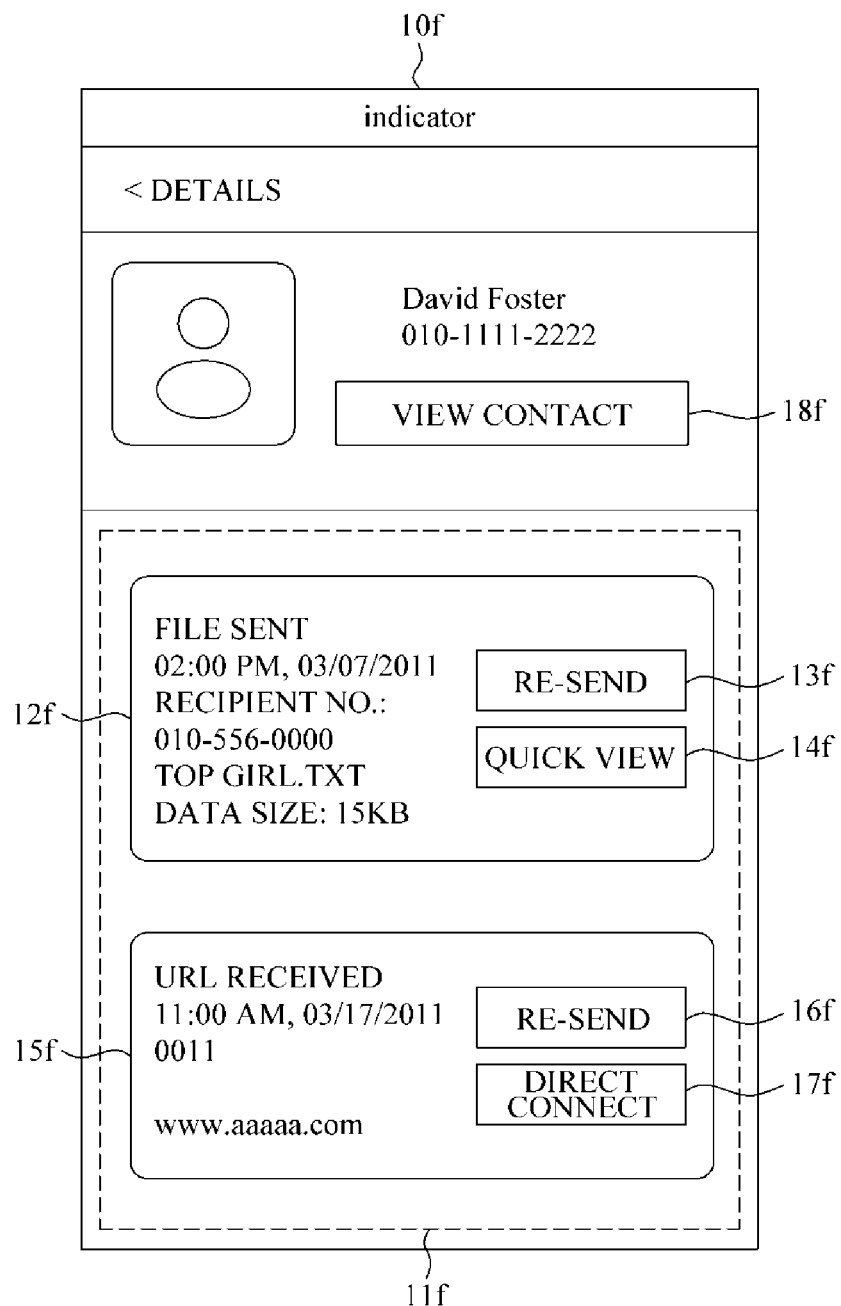

FIG. 6F is a diagram illustrating a display screen of the user terminal when a control signal for selecting a contact in a predetermined or designated input region is detected.

Referring to FIG. 6F, the user terminal may extract a communication history with David Foster when an input is detected in the input region for selecting David Foster, and display all the extracted communication histories with David Foster. More specifically, David Foster may be selected from the communication history displayed (see FIG. 6A). Further, on screen 11*f* displayed on the user terminal, the communication events may be displayed according to the temporal order of the occurrence. In FIG. 6F, file communication information 12*f* and URL communication information 15*f* may be displayed sequentially according to the temporal order of the occurrence of the communication events. However, aspects of the invention are not limited thereto, such that the communication events may be displayed according to a type of content.

Further, communication histories, including file communication information 12*f* and URL communication information 15*f*, may further have an additional icon for indicating an additional function(s) that may utilize the corresponding communication. For example, referring to FIG. 6F, the file communication information 12*f* may be displayed with icons for, for example, re-send button 13*f*, quick view button 14*f*, and the like. The URL communication information 15*f* may be displayed along with re-send button 16*f*, direct connection button 17*f*, and the like. Further, the icons additionally displayed according to the content type associated with each communication history may vary.

Figure 7A:
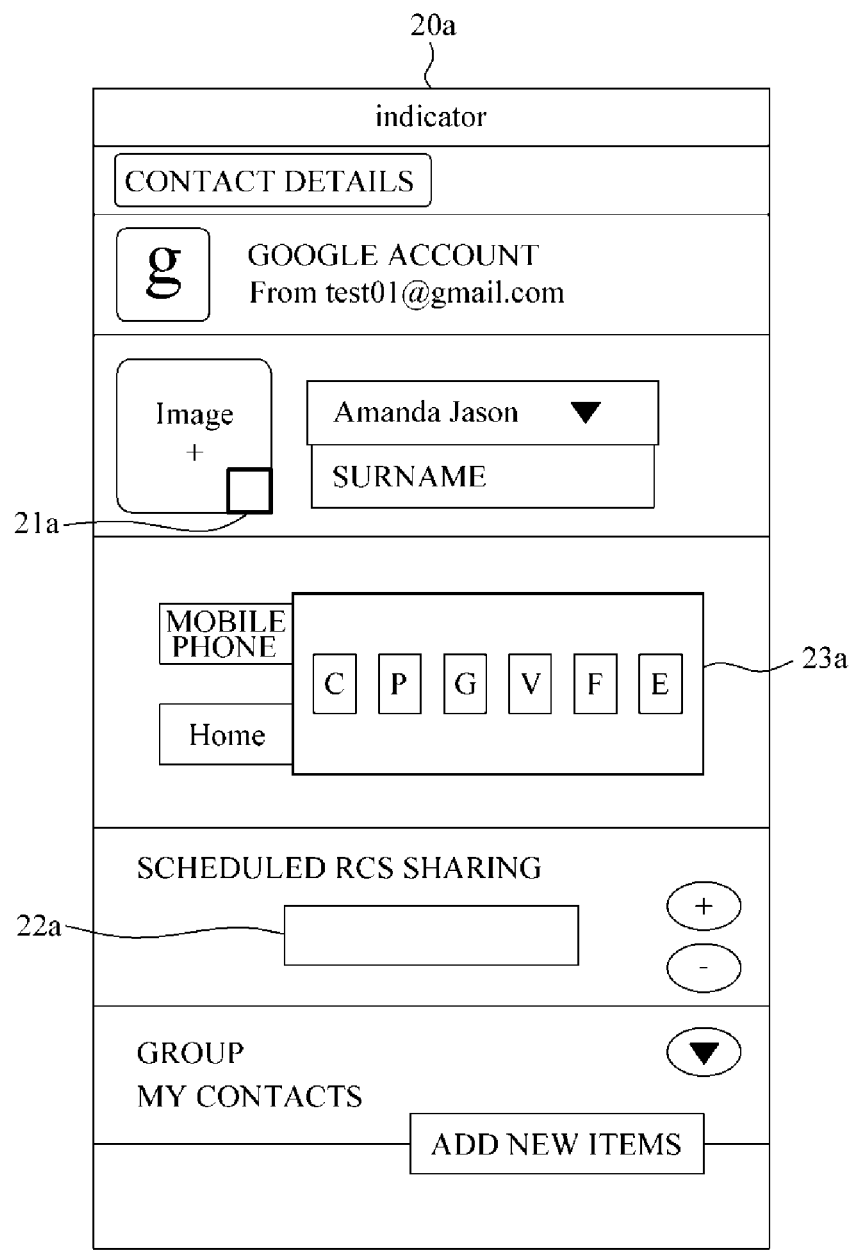
Figure 7B:
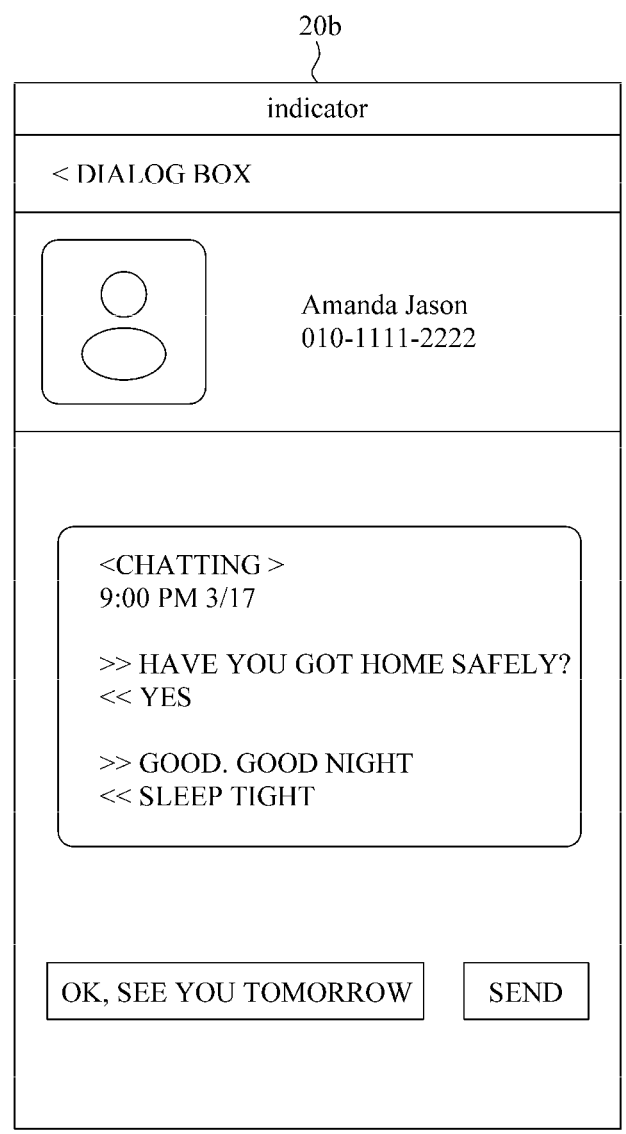

FIG. 7A, FIG. 7B, and FIG. 7C are diagrams illustrating a method for displaying an integrated communication history when an application, other than an RCS call application, is executed according to exemplary embodiments of the present invention.

The contacts application illustrated in FIG. 7A, FIG. 7B, and FIG. 7C may include, without limitation, a contact management application that manages at least one contact stored in the user terminal. FIG. 7A illustrates a user interface displayed on the display screen when "Amanda Jason" is selected from the running contacts application. However, aspects of the invention are not limited thereto, such that the user interface may be configured differently.

The display screen of FIG. 7A in association with the contacts application may be the same as a display screen that may be displayed when the user selects "Amanda Jason" by selecting an icon 18*f* for showing contacts.

Referring FIG. 5 and FIG. 7A, the user terminal loads a communication history of "Amanda Jason" in operation S151. In operation S153, the user terminal additionally displays a predetermined user interface, which may be generated based on the loaded communication history, on an initial display screen that is displayed upon executing the contacts application. The user interface features additionally displayed on the screen in relation to the communication history may be either or both of a communication history icon 21a and a scheduled RCS sharing icon 22a.

In operation S155, the user terminal monitors an input of the control signal. For example, the user terminal may detect a control signal generated or inputted through a user interface feature 21a or 22a. More specifically, the user terminal may detect or determine whether the user has touched a corresponding icon 21a or 22a. Further, in S157, when it is detected that the control signal has been generated, the user terminal changes the display screen in response to the control signal. The screen display to be changed may vary according to a type of the generated control signal (e.g., a type of the selected icon), and details of the display screen may be set in the user terminal in advance. For example, in response to a detection of the user touches on the history icon 21a, the user terminal may display a new user interface in a popup window 23a to show the communication history of selected "Amanda Jason." FIG. 7A illustrates communication histories are displayed as icons for each content type. For example, the popup window 23a may display the communication histories in a temporal sequence (e.g., in order from recent communication to old). However, aspects of the invention are not limited thereto, such that the popup window 23a may display communication histories according to different attributes or in different temporal sequence.

In response to detecting a control signal from the user that selects icon C, which may indicate content associated with a chat message, the user terminal may extract chat conversation history with "Amanda Jason," and display a user interface generated based on the extracted communication history on the display. FIG. 7B is a diagram illustrating display screen 20b, which displays a button with recommended response "ok, see you tomorrow", recent chat messages exchanged with "Amanda Jason," and a menu (e.g., "Send" icon) for sending the text. In another example, the communication history may be displayed in various ways. For example, a list of chat messages exchanged with "Amanda Jason" may be displayed in order of date.

In response to detecting a control signal selecting a scheduled sharing icon 22a displayed on the display screen, the user terminal may further display a new or modified user interface allowing the user to select content to be shared. For example, a user interface feature, such as the popup window 23a, which may enable the user to select a type of content may be displayed. Further, a list of contents with respect to its type selected through the icon may be displayed, or a list of contents without regard to its type, all or a predetermined number of content that are available for sharing may be displayed. The list of contents may be displayed in a form of a time-ordered list. However, aspects of the invention are not limited thereto, such that the list of contents may be ordered based on other attributes. Further, in response to a control signal being input from the user to select a particular type of content, the user terminal may display a list of the selected content types that may be available for sharing. For example, in response to the user's selection of icon V, a list of videos (e.g., music videos) available for sharing may be displayed on a display screen 20c as shown in FIG. 7C.

FIG. 8A, FIG. 8B, FIG. 8C, and FIG. 8D are diagrams illustrating a method for displaying an integrated communication history when an application, other than an RCS call application, is executed according to exemplary embodiments of the present invention.

The search application shown in FIG. 8A, FIG. 8B, FIG. 8C, and FIG. 8D may search for particular information (e.g., RCS call history, history of content shared through RCS call) from memory of a user terminal. In addition, the example shown in FIG. 8A may be a user terminal displayed in response to search for a history of content shared through RCS call. However, aspects of the invention are not limited thereto. A display screen of the search application shown in FIG. 8A may be a screen displayed in response to user's selecting a list of content shared using a share operation or share menu in the RCS call application.

Figure 8A:
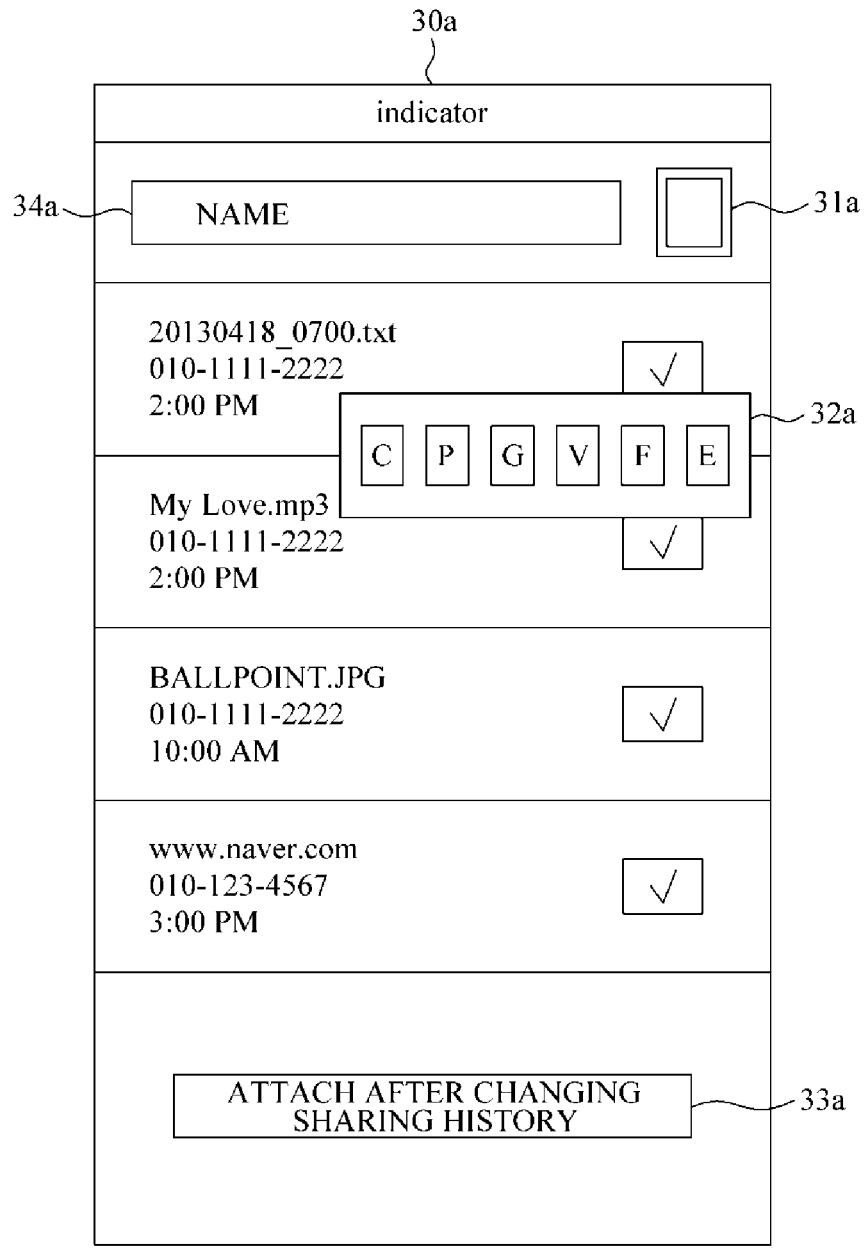
FIG. 8A, FIG. 8B, FIG. 8C, and FIG. 8D are diagrams illustrating a method for displaying an integrated communication history when an application, other than an RCS call application, is executed according to exemplary embodiments of the present invention.

Referring to FIG. 5 and FIG. 8A, the user terminal displays a display screen 30a by adding user interface features 31a and 34b, which are related to the communication history, to an original display screen associated with the search application in operation S153. Referring to FIG. 8A, the user terminal may additionally display, on the screen 30a, a text input box 34a, a content type icon 31a, and a menu button 33a, which recites "ATTACH AFTER CHANGING SHARING HISTORY," for sharing found content. Further, the user terminal may also display a shared content list based on communication histories, which may be generated in temporal order of sharing. The text input box 34a may enable the user to search for intended content and the content type icon 31a may specify a type of searched content.

In operation S135, the user terminal monitors whether a control signal corresponding to a touch of the user to any of the additionally displayed user interface features, including a content type icon 31a, a menu button 33a, and a text input box 34a has occurred. In response to a detection of the control signal, the user terminal may change the display screen in response to the control signal in operation S137. For example, when the user touches the content type icon 31a, an icon enabling the user to select content type to be searched for may be displayed in a popup window 32a, which may be overlaid over the current display. Further, when a control signal is generated due to the selection of one of displayed icons, the user terminal may display a communication history related to the selected content type on the screen.

A user interface displayed on the screen may vary based on the selected content type. A more efficient method for displaying content may differ according to the content type, and menus associated with the RCS service may vary based on the content type.

Figure 8B:
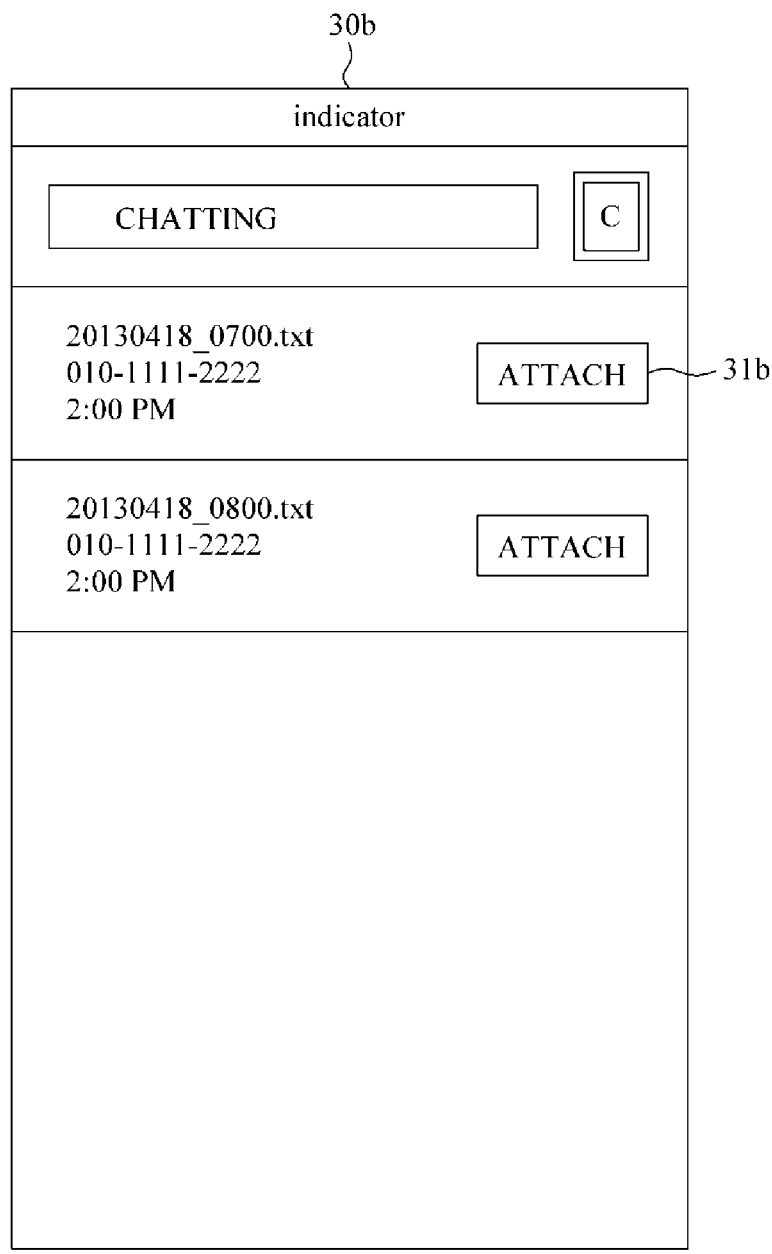
Figure 8C:
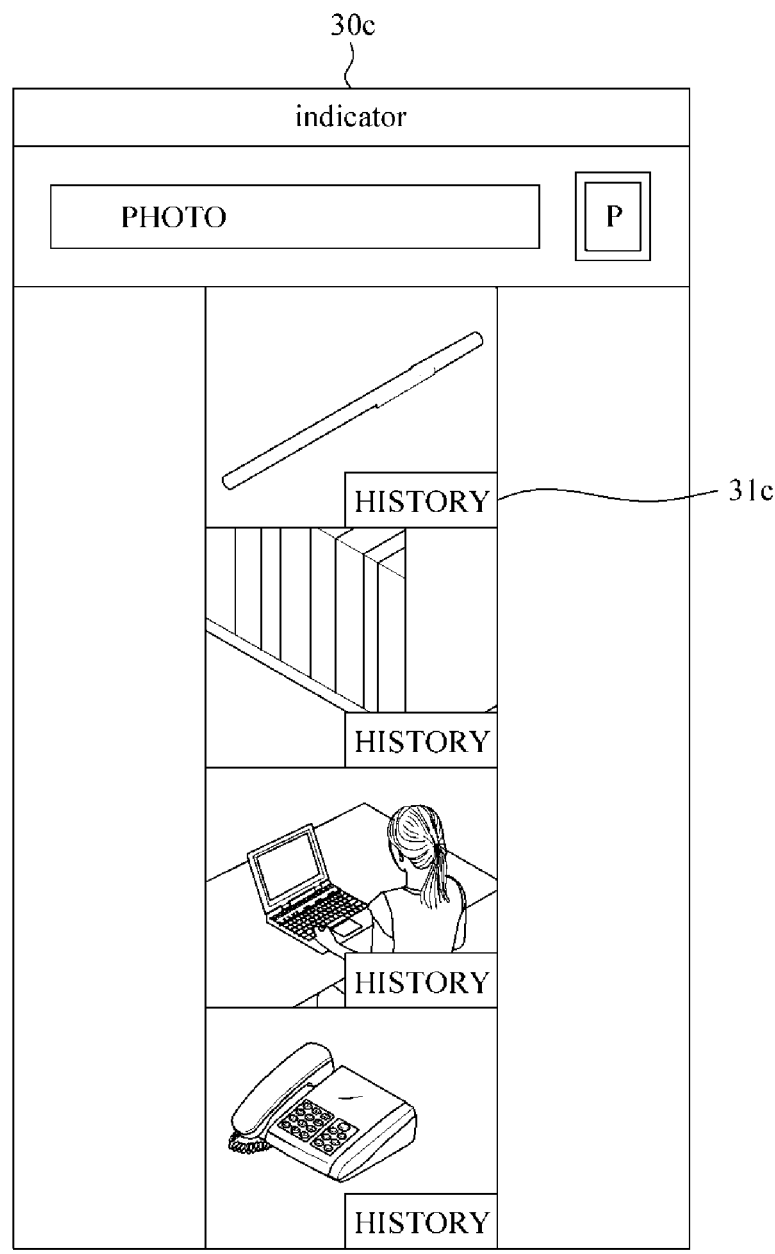

FIG. 8B and FIG. 8C are diagrams illustrating a screen displayed according to content type found in FIG. 8A (content type selected through the user interfaces 31a and 33a) according to exemplary embodiments of the present invention. FIG. 8B shows a screen when the content type is chat (icon C) according to an exemplary embodiment of the present invention. FIG. 8C shows a screen when the content type is photo (icon P) according to an exemplary embodiment of the present invention.

Referring to FIG. 8B, when a chat message is selected as a content type to be searched, the user terminal may search or detect a communication history related to a chat message, and display a screen 30b showing chat information (e.g., chat lists arranged by date/friend). Further, one or more chat lists shown in the screen 30b may display a predetermined user interface related to the chat message or service. Further, as shown in FIG. 8B, a history icon 31b may be displayed along with the screen 30b, allowing the user to select display of all conversations.

Referring to FIG. 8C, when a photo is selected as a content type to be searched, the user terminal may detect a communication history related to photos, and display a screen 30c showing photo information (e.g., lists of photos that have been transmitted or received through RCS call). The screen 30c may be generated based on the detected communication history.

Further, one or more photo lists shown in the screen 30c may display a predefined user interface related to the photo. Referring to FIG. 8C, a menu 31c is displayed along with the screen 30c, which may allow the user to select display of a history of the photo being shared through the RCS call, e.g., the transmission/reception history.

Figure 8D:
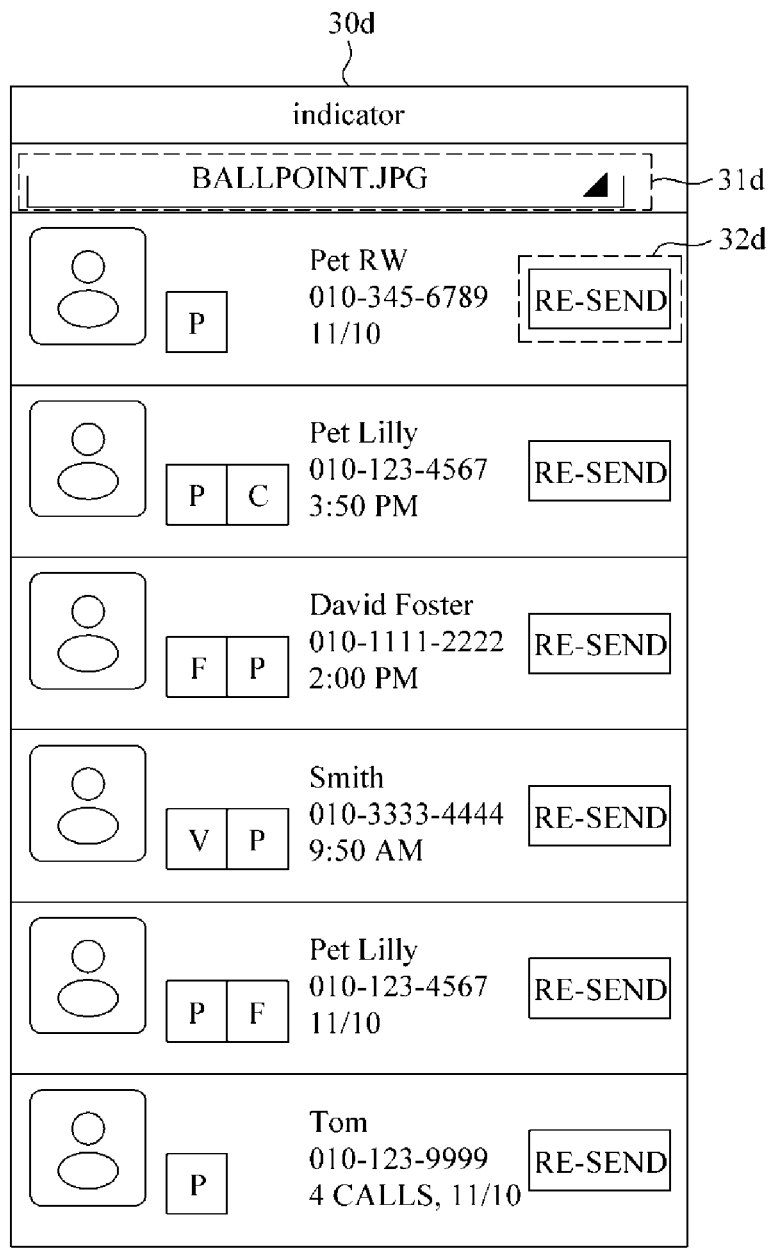

FIG. 8D illustrates a screen displayed on a display of the user terminal when the user selects a history icon 31c displayed on or with a photo of a ballpoint pen (the photo name may be "ballpoint.jpg") on the top of the screen 30c shown in FIG. 8C. Referring to FIG. 8D, in response to the user's touch on the history icon 31c, a file name of the selected file may appear in a text box 31d on the top of the screen 30d. Further, under the text box 31d, a communication history related to the transmission or reception of the selected file is in the form of list consisting of communication events in a temporal sequence. Each communication events in the list shown in FIG. 8D has Picon associated with it, which may indicate that the selected file, e.g., "ballpoint.jpg" file has been communicated during the corresponding communication. In addition, one or more events included in the list may also display a user interface feature, such as an icon, for performing another operation with respect to the intended content, for example, resending of the selected file through RCS service (e.g., "Re-send" menu button 32d).

According to the exemplary embodiments of the present invention, communication histories may be managed according to a type of content transmitted or received in an integrated communication environment. Further, the communication histories may be provided based on the content type, so that communication details can be more efficiently displayed to the user. Further, the communication histories may be displayed using interfaces including various icons or input areas thereby increasing accessibility and reusability of the communicated content.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

I claim:

1. A method for managing an integrated communication history of a user terminal, the method comprising:
   transmitting and/or receiving a content using an integrated communication service; and
   executing instructions on a processor of the user terminal to perform processes of:
   collecting a communication history of content transmission and/or reception using the integrated communication service, the communication history including at least one of content type, content transmission/reception time, and content sender/recipient contact of each content transmission or reception;
   extracting, among the collected communication history, a classified communication history in association with a specific content type;
   displaying the classified communication history including one or more contents of the specific content type, each content in the classified communication history being associated with one or more contacts; and
   receiving a user input for selecting a particular content among the contents in the classified communication history,
   wherein, in response to receiving the user input for selecting the particular content, the method further comprises:
   identifying an associated contact for the particular content; and
   displaying a specific communication history in connection with the associated contact for the particular content.

2. The method of claim 1, further comprising:
   receiving a user input for selecting the specific content type,
   wherein the classified communication history is displayed in response to receiving the user input for selecting the specific content type.

3. The method of claim 1, further comprising:
   executing, in response to receiving the user input for selecting the particular content, an application related to the specific content type of the particular content; and
   displaying the particular content via the executed application.

4. The method of claim 1, further comprising:
   displaying one or more icons, in the classified communication history, each of which is related to each content in the classified communication history; and
   receiving the user input for selecting the particular content via a touch input for a particular icon among the one or more icons.

5. The method of claim 4, wherein each icon in the classified communication history displays information related to the one or more contacts being associated with.

6. The method of claim 4, wherein a shape of the one or more icons displayed in the classified communication history is determined based on the specific content type for displaying the classified communication history.

7. The method of claim 1, wherein the content type comprises at least one of text communication, image data, video data, documents, unified resource location (URL), or location information.

8. A user terminal to manage an integrated communication history, the user terminal comprising:
   a processor configured to execute one or more applications to support an integrated communication service, the applications comprising:
   a communication history manager configured to collect a communication history of content transmission and/or reception using the integrated communication service, the communication history including at least one of content type, content transmission/reception time, and content sender/recipient contact of each content transmission or reception;
   an interface manager configured to provide a user interface for the user terminal;
   a communicator configured to transmit and/or receive content using the integrated communication service; and an image display configured to display one or more images under a control of the processor, wherein, by using the one or more applications, the processor is further configured to:

extract, among the collected communication history, a classified communication history in association with a specific content type, display, by using the image display, the classified communication history including one or more contents of the specific content type, each content in the classified communication history being associated with one or more contacts, and receive, via the interface manager, a user input for selecting a particular content among the contents in the classified communication history, wherein, in response to receiving the user input for selecting the particular content, the processor is further configured to:

identify an associated contact for the particular content, and display, by using the image display, a specific communication history in connection with the associated contact for the particular content.

9. The user terminal of claim 8, wherein the processor is further configured to receive, via the interface manager, a user input for selecting the specific content type, and wherein the classified communication history is displayed in response to receiving the user input for selecting the specific content type.

10. The user terminal of claim 8, wherein the processor is further configured to:

execute, in response to receiving the user input for selecting the particular content, an application related to the specific content type of the particular content; and display, by using the image display, the particular content via the executed application.

11. The user terminal of claim 8, wherein the interface manager is further configured to:

display one or more icons, in the classified communication history, each of which is related to each content in the classified communication history; and receive the user input for selecting the particular content via a touch input for a particular icon among the one or more icons.

12. The user terminal of claim 11, wherein each icon in the classified communication history displays information related to the one or more contacts being associated with.

13. The user terminal of claim 11, wherein a shape of the one or more icons displayed in the classified communication history is determined based on the specific content type for displaying the classified communication history.

14. The user terminal of claim 8, wherein the content type comprises at least one of text communication, image data, video data, documents, unified resource location (URL), or location information.

* * * * *